United States Patent [19]

Daniels et al.

[11] Patent Number: 4,813,182

[45] Date of Patent: Mar. 21, 1989

[54] GATES

[75] Inventors: Kurt Daniels; John D. Williams; Percy W. Wise; Ian Jackson, all of Kent; John Cox, Wiltshire, all of England

[73] Assignee: H. S. Jackson & Son (Fencing) Ltd., Kent, England

[21] Appl. No.: 52,258

[22] Filed: May 20, 1987

[30] Foreign Application Priority Data

May 20, 1986 [GB] United Kingdom ................. 8612183

[51] Int. Cl.[4] .............................................. E06B 3/00
[52] U.S. Cl. ...................................... 49/501; 49/381; 49/395; 292/218; 403/231; 403/264
[58] Field of Search .................... 49/501, 395, 381; 403/231, 264, 260, 256; 292/DIG. 32, 218

[56] References Cited

U.S. PATENT DOCUMENTS

| 870,460 | 11/1907 | Peeples | 292/DIG. 32 |
|---|---|---|---|
| 1,447,705 | 3/1923 | Anderson | 49/395 X |
| 1,806,772 | 5/1931 | Wasberg et al. | 292/DIG. 32 |
| 1,828,912 | 10/1931 | Tobin et al. | 292/DIG. 32 |
| 1,959,709 | 5/1934 | Deeds | 39/78 |
| 2,172,868 | 9/1939 | Elson | 39/82 |
| 2,455,772 | 12/1948 | Jackle | 292/88 |
| 3,022,045 | 2/1962 | Silvers | 49/501 X |
| 3,083,561 | 4/1963 | Sussina | 70/139 |
| 3,328,056 | 6/1967 | Heiken | 403/231 |
| 3,845,604 | 11/1974 | Ottosson | 403/231 X |
| 3,908,311 | 9/1975 | Romberg | 49/381 |

FOREIGN PATENT DOCUMENTS

| 1534841 | 8/1964 | Fed. Rep. of Germany . |
|---|---|---|
| 2420688 | 4/1974 | Fed. Rep. of Germany . |
| 1556846 | 3/1968 | France . |
| 2163343 | 7/1973 | France . |
| 464145 | 4/1937 | United Kingdom . |
| 896630 | 5/1962 | United Kingdom . |

Primary Examiner—Philip C. Kannan
Attorney, Agent, or Firm—Jeffers, Hoffman & Niewyk

[57] ABSTRACT

In a gate, a stile (20) and rail (21) abut side face to end face and are held together by a bolt passing at right angles through the end face to pull against a plate (25) located in a slot (26). Straps (34,41), see FIGS. 11 and 13, are used to reinforce the hanging and shutting stiles (20,20A) and to carry hanging and latching parts. A latching mechanism, see FIGS. 13 to 16, includes a latching bar (43) that is pivotally connected to the shutting stile (20) towards its middle by a flange (44). A leaf spring (45) urges the bar (43) into a latching position at which, when the gate is shut, the bar (43) is caught behind upper and lower retainers (46) mounted on a shutting gatepost (48). By pulling on a handle (50), the bar (43) can be rocked free of the retainers (46) to permit the gate to be opened. Connector plates (31) having sharp tongs are used, see FIGS. 9 and 10, with bolts to connect reinforcing struts (30) to the upper and lower rails (21,21A). Upper and lower hinge brackets for mounting on a hanging gatepost are also provided, see FIGS. 17 to 23.

12 Claims, 8 Drawing Sheets

UPPER RETAINER

LOWER RETAINER

GATES

The invention relates to a new construction of a predominantly timber gate, and associated fittings, which may be used, particularly, as a farm gate or as a large domestic gate.

The traditional five bar gate comprises five horizontal rails, the ends of which are cut to form tongues which are received in complementary slots in the vertical hanging and shutting stiles at each end of the gate, the rails being secured to the stiles by transverse dowels or bolts. Additional rigidity is often provided by one or more inclined struts, which are secured to the rails at the crossover points by transverse dowels or bolts Such gates have been used for centuries but they do suffer the disadvantages that they tend, after a period of time, to drop out of a true rectangular shape so that the latching mechanism does not line up and so that the bottom of the shutting stile catches on the ground; and that the overall appearance of the gate cannot be varied significantly to improve the appearance The inventors have now developed an entirely new gate system which can replace the traditional five bar gate, and which involves a number of novel aspects.

According to a first aspect of the invention, a gate comprises a rectangular frame of upper and lower timber rails, a hanging timber stile and a shutting timber stile; the frame having at each corner a rigid connection between a rail end and a stile end, the connection being formed by a side face of one of the ends overlapping the end face of the other of the ends with a bolt extending transversely through the one and longitudinally into the other of the ends where it screws through a screw threaded aperture in an insert which has been inserted into a transverse slot in the other of the ends. This provides a very strong connection between rail and stile ends at each corner of the frame, with the minimum of preparatory work, other than the cutting of the slot to receive the insert, and the drilling of holes to receive the bolt. The connection can also be undone very easily and the end face of the other of the ends trimmed back if the rectangular shape of the frame and gate has to be adjusted for any purpose.

The inserts are preferably plate-like, so that the accommodating slot is narrow but a large surface is presented to the side of the slot to take the reaction when the bolt is tightened. In one example the insert is D-shaped with the screw threaded aperture through the plate concentric with the curved portion of the D.

The top and bottom rail ends may overlap the end faces of the stiles, so that the bolts extend vertically downwards through the rails into the ends of the stiles in which the inserts are provided. Preferably however the stile ends overlap the end surfaces of the top and bottom rail ends so that the bolts extend horizontally through the stile ends and are screwed into the inserts let into the rails.

In order to improve the integrity of the frame corners, angular metal straps are preferably wrapped around each corner of the frame, each bolt passing through an aperture in one arm of a respective strap before entering transversely the one stile or rail end. The other arm of the strap then preferably passes over the end surface of that stile or rail end and overlaps the side surface of the other stile or rail end, to which it is secured by, for example, a screw. The straps at the top and bottom of each stile may be integrally connected by an intermediate strap portion to provide a full height stile strap, which may be received in a longitudinal recess in the stile. The hanging stile strap may be provided with, or be arranged to be fitted with, hinge parts for hanging the frame on a hanging post, and the shutting stile strap may be provided with, or be arranged t be fitted with, latching parts for holding the frame closed relatively to a shutting post.

Metal parts, such as the strap ends and inserts, which may be exposed, particularly at the top of the upper rail, may be covered by a capping strip of shallow U-section to provide a smooth edge surface to the frame.

Although the rectangular frame per se is extremely rigid, it may be desirable to provide one or more inclined reinforcing struts extending between the top and bottom rails. If two such struts are provided, they may be in chevron formation, and if three or more, in zig-zag formation. The strength of the frame, however, makes it unlikely that it is necessary to provide two chevron arrangements, one inverted relatively to the other, overlapping one another at the same position along the frame, as is conventional with five bar gates.

When the underside of the top rail, and/or the upper side of the bottom rail, is flat and horizontal, the ends of each inclined strut may be secured to the rails in accordance with the second independent aspect of the invention, in accordance with which each strut end surface is chamfered so as to be horizontal and is located adjacent to the respective horizontal rail surface with an interposed plate connector, and the joint is secured by a bolt passing transversely through the rail, through a hole in the plate connector, and into a screw threaded aperture in a barrel nut which has been inserted transversely into the strut. By a plate connector is meant a metal plate having pointed tangs projecting in both directions from the plane of the plate so that when timber members are drawn up against both faces of the plate, the tangs bite into the timber. This arrangement, using a plate connector, bolt and barrel nut at each end of each inclined strut provides a very secure fixing, with the minimum of preparatory work.

An important advantage of the new frame construction is that, except for the optional inclined struts, the essential rigidity of the gate is independent of the infilling. This enables a variety of different types of aesthetic infilling to be adopted without undue consideration being given to the contribution which it makes to the structural integrity of the frame. The infilling may involve horizontal rails, in the manner of a five bar gate, or vertical rails, or inclined rails, or planks cut to various shapes. The panel of infilling, which need not be an integral panel, is preferably received within a rebate extending around an inner edge of each of the upper and lower rails and/or stiles. In that case, when the inclined struts are used and are secured to the upper and lower rails using the interposed plate connectors, the struts will normally be fitted in the plane of the unrebated portions of the upper and lower rails and/or stiles.

The new gate system also includes a novel latching device and, according to a third independent feature of the invention, a latching device for a gate frame comprises an elongate member which is carried by the frame and extends upwards alongside a shutting stile of the frame, the member being mounted so that it may rock about an axis substantially about its mid point and perpendicular to the plane of the frame with a limited freedom of movement, and being urged by a spring to rock in one sense; and a pair of retainers which are carried one adjacent to the top and one adjacent to the bottom of a shutting post for the gate, for engaging the elongate member adjacent to its upper and lower ends respectively when the gate is shut to hold the gate shut.

With this arrangement, the frame is held shut adjacent to both its top and bottom, thereby providing double security and limiting the possibility of twisting of the gate if it is climbed on, or otherwise distorted, when closed.

The elongate member may be a metal rod or tube, which is guided in slots carried by the frame at its shutting end adjacent to its upper and lower ends, and which passes through a yoke adjacent to its mid point, to provide the rocking pivot. The spring for urging the member to rock in one direction may be a leaf spring and, if this extends generally in the vertical direction between a fixing to the frame and a fixing to the elongate member, the spring may substantially support the weight of the elongate member. Most simply, the elongate member is guided and/or carried by parts integral with the previously mentioned stile strap used optionally in conjunction with the first aspect of the invention.

The retainers may be bent from metal plate and bolted to the shutting gate post. They may have round noses over which the ends of the elongate member ride, to cause the member to rock against its spring urging as the gate is slammed shut, whereafter the spring causes the elongate member to rock back so that its ends snap behind the retainer noses. The retainers will of course be fitted with opposite hands to allow for the movement of the ends of the elongate member one towards the frame and one away from the frame during the same rocking motion.

The elongate member is preferably arranged to rock so that its upper end moves towards the body of the gate to unlatch the gate. Manual force is then applied to the upper end of the elongate member, for example to a knob or other handle fitted to the upper end of the elongate member. To avoid possible bruising of the hand between the upper end of the elongate member and the shutting gatepost, the upper end of the elongate member may be cranked in the plane of the gate back towards the body of the gate so that the handle part is above the gate frame and spaced more than it would otherwise be from the shutting post.

A fourth independent aspect of the invention concerns the manner in which the weight of the gate frame is taken by the hanging gatepost. Conventionally there is used an L-shaped member having a vertical arm, which forms an upper hinge pin and a horizontal arm which passes through the hanging post, the horizontal arm being partially of square section to inhibit rotation in the post and terminating in a screw threaded portion which projects from the other side of the post and receives a washer and nut. Since the weight of the frame is essentially taken by the member, on a flange at the bottom of the vertical hinge pin arm, there is a tendency for the member to rotate in the post. Also, the projecting end of the horizontal arm of the member, which usually projects beyond the washer and nut, is a dangerous projection to both persons and animals.

According to the fourth aspect of the invention, a hanging pin bracket for fitting to a hanging gatepost comprises a body which is arranged to abut the side of a hanging gatepost, and which has two horizontally projecting portions which are arranged to be received in vertically spaced holes in the post, the upper projecting portion being an internally screw threaded spigot which is arranged to receive a bolt inserted through, and from the far side of, the gatepost; and the body carrying an upstanding hinge pin to be received in an aperture in a gate bracket, and a flange spaced from the upper end of the hinge pin for the gate bracket to rest upon.

The use of upper and lower projecting portion received in holes in the post avoids twisting of the bracket, and the provision of the screw threaded socket to receive a bolt inserted from the far side of the post avoids any dangerous projection from the far side of the post.

Most simply the body is formed by an inverted L-shaped strip of plate, the horizontal arm of which provides the flange and the vertical arm of which is arranged to abut the post; and a substantially L-shaped metal bar, a vertical arm of which passes upwards through the horizontal arm of the plate strip to provide the hinge pin, and a horizontal arm of which passes through the lower part of the vertical arm of the plate strip to provide the lower horizontal projecting portion.

A fifth independent aspect of the invention concerns a lower hinge bracket for a hanging gatepost, and in accordance with this aspect, such a bracket comprises a body which is arranged to abut the side of the gatepost, and has a horizontally projecting internally screw threaded spigot which is arranged to be received in a hole in the gatepost and to receive a bolt inserted through, and from the far side of, the gatepost to secure the lower bracket to the post; and a horizontal portion projecting in use from the body and provided with a plurality of holes spaced from one another perpendicular to the plane of the gate, selectively to receive a hinge pin interconnecting the lower bracket with a gate hinge bracket.

With this arrangement the screw threaded spigot and bolt inserted from the far side of the post again avoid any dangerous projection from the far side of the post. Also, the plurality of selectively useable holes in the horizontal portion of the bracket enable the bottom of the frame to be fitted at a variety of positions. For example, this can compensate for slight tolerances of the gatepost from the vertical, or provide for the hinge axis of the gate to be slightly out of vertical so that the gate frame rises or falls as it opens. The bracket may have three of the holes, a central one for straight swinging and one on each side for swinging upwards in a respective direction. Alternatively, there may be only two of the holes, one for straight swinging and the other for swinging upwards in a direction dependent on which way up the bracket is used, reversability being provided by an ability to rotate about the axis of the spigot prior to tightening the bolt.

The complementary bracket on the frame may have a horizontal portion formed with a hole to be aligned with a selected hole in the horizontal portion of the gatepost bracket to receive the common hinge pin. Adjustment in the plane of the gate relatively to the vertical of the hanging stile of the gate may be obtained by providing the horizontal portion of the gate bracket with a screw threaded shank which passes through a hole in the gate stile and is adjustably fixed in the hole by nuts on the shank, one on each side of the stile. The hinge pin interconnecting the complementary bottom bracket may be a bolt carrying a nut so that simple lifting off of the gate from its hinges is prevented.

The five independent aspects of the invention may be used individually or in any combination with one another.

An example of a gate constructed in accordance with the present invention will now be described with reference to the accompanying drawings, in which.

Figure 1:
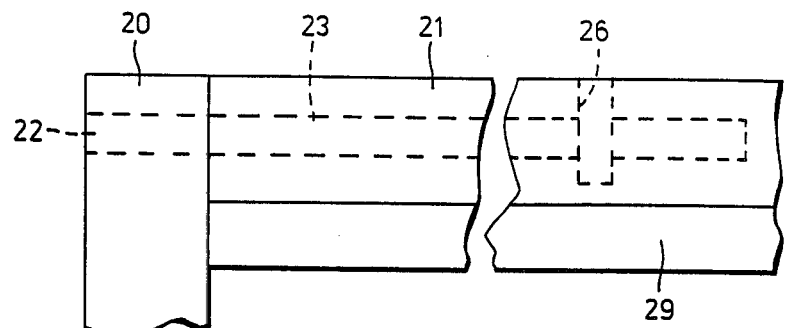
FIGS. 1 to 6 illustrate the construction of the gate where a stile and rail join at a corner.
Figure 2:
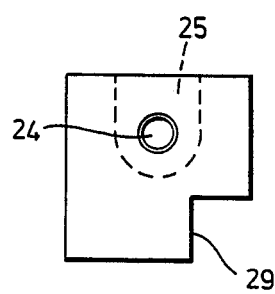

FIGS. 1 to 2 illustrate the first aspect of the invention with the upper end of a stile 20 secured to an end of an upper rail 21 by a bolt passing through holes 22 and 23 and into a screw threaded aperture 24 in a plate 25 which is inserted into a slot 26 in the rail.

Figure 3:
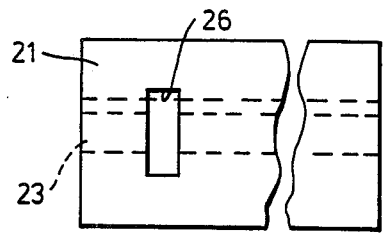

FIG. 3 is a plan view of the rail 21.

Figure 4:
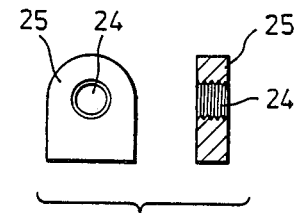

FIG. 4 shows two views of the insert 25.

Figure 5:
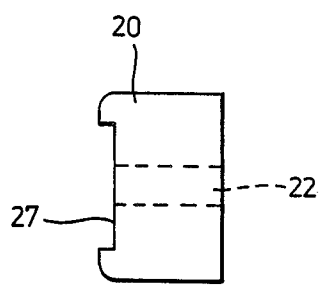

FIG. 5 is a plan view of the stile 20 showing that it has a recess 27 for a metal strap.

Figure 6:
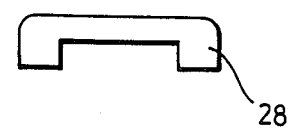

FIG. 6 is a section through a timber capping rail 28 for covering the metalwork exposed at the top of the upper rail 21.

Figure 7:
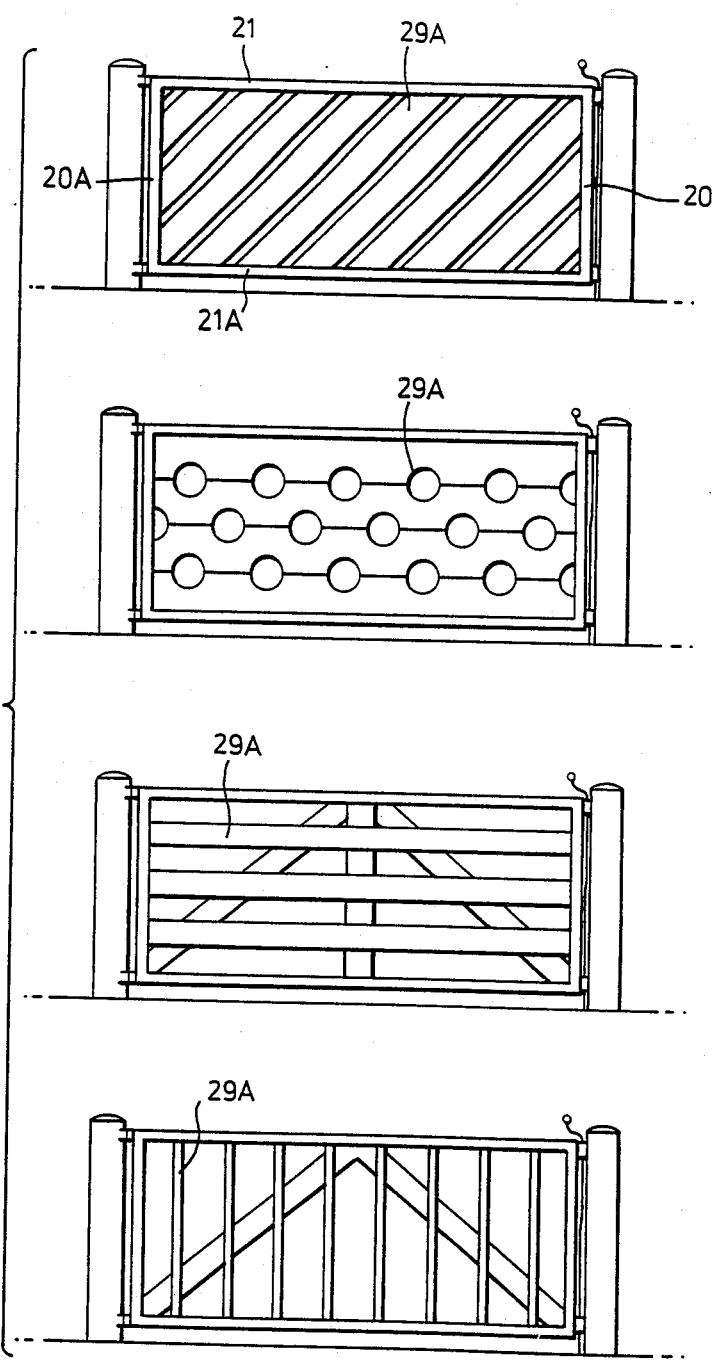
FIG. 7 shows the gate containing four different types of infilling.

FIGS. 1 and 2 also show a rebate 29, which is cut in the upper and lower rails 21 and 21A and stiles 20 and 20A to accommodate a panel of infilling 29A, of which four designs are shown in FIG. 7.

Figure 8:
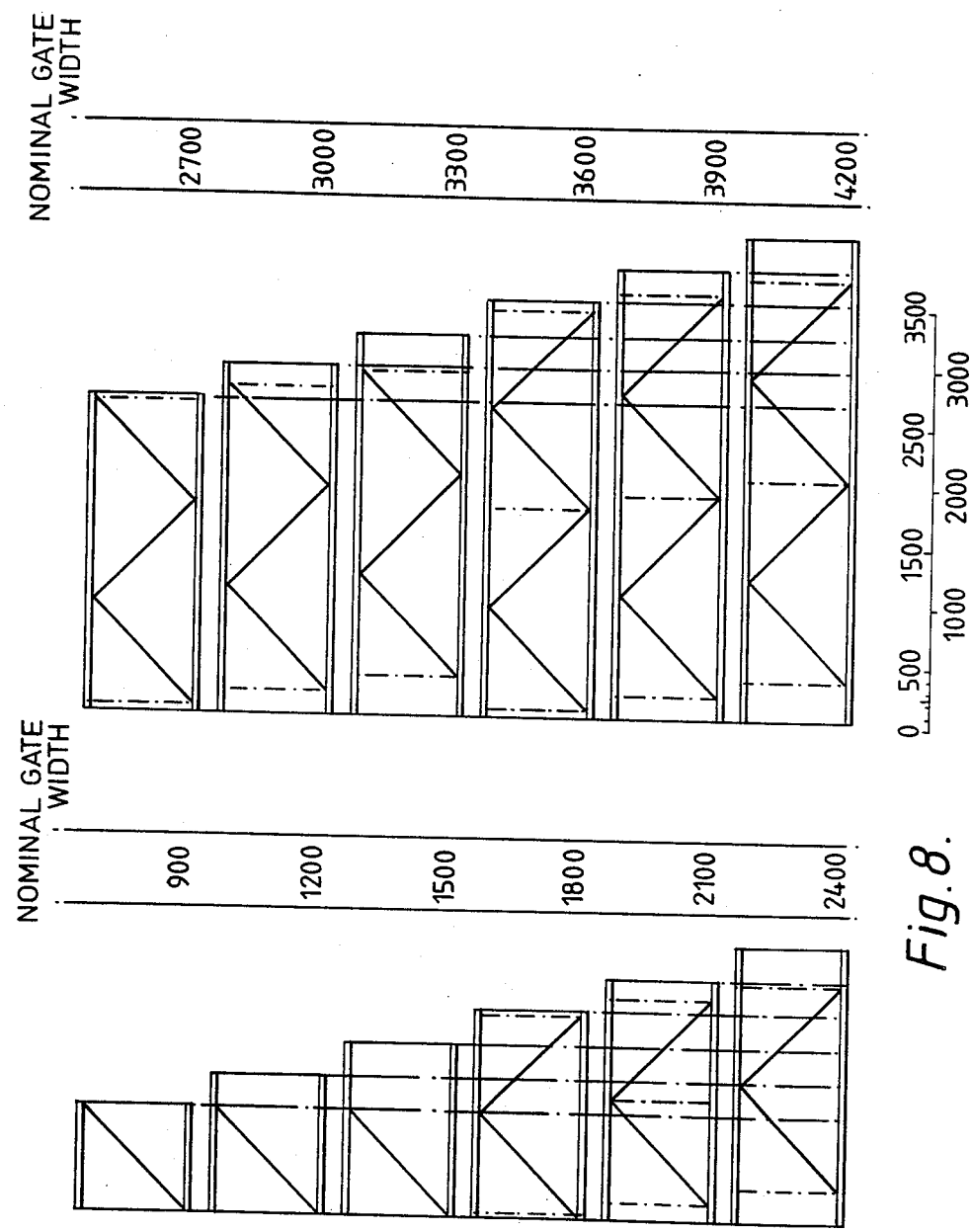
FIG. 8 shows how the arrangement of reinforcing struts varies in accordance with gate width.

The frame provided by the upper and lower timber rails 21,21A and timber stiles 20,20A may be reinforced by inclined timber struts 30, and a variety of modular patterns of struts depending upon gate length, are illustrated in FIG. 8.

Figure 9:
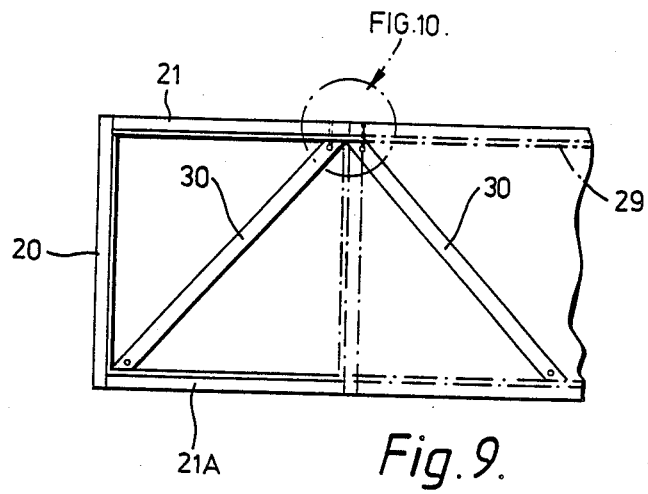
FIGS. 9 and 10 show how the struts of FIG. 8 are attached to the rails.
Figure 10:
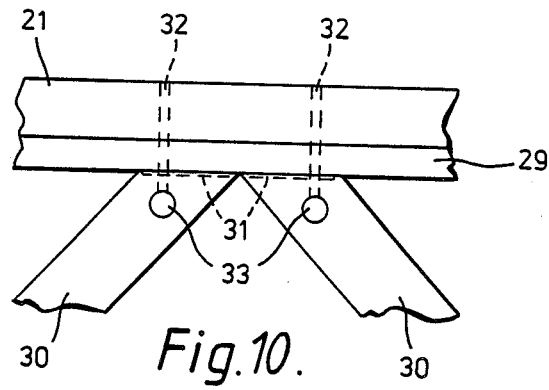

FIGS. 9 and 10 show how the ends of the struts 30 are secured to the rails 21,21A in accordance with the second aspect of the invention. Thus connector plates 31 are inserted between chamfered horizontal end surfaces of the struts and the horizontal surfaces of the respective rails, and the joint is completed by bolts passed through holes 32 and into barrel nuts 33.

Figure 12:
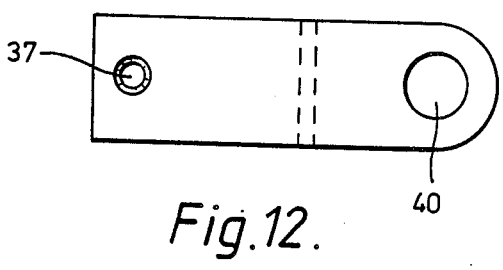
FIGS. 11 and 12 illustrate a strap that runs the full length of the hanging stile and incorporates hinge parts.
Figure 11:
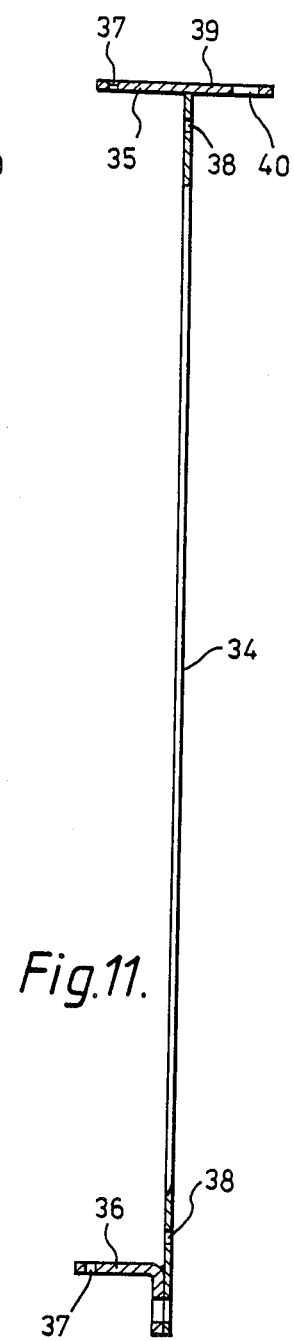

FIGS. 11 and 12 show a metal strap 34 to be accommodated in the recess 27 of the hanging stile 20A. Return flanges 35 and 36 overlap the top of the upper rail 21 and the bottom of the lower rail 21A and have holes 37 through which screws are passed into the rails. The vertical portion of the strap 34 has holes 38 to receive the bolts which pass into the holes 22,23. At its upper end, the strap has an outer flange 39 with a hole 40, forming a hanging bracket for locating over an upper hanging pin on a gatepost to take the weight of the gate frame.

Figure 13:
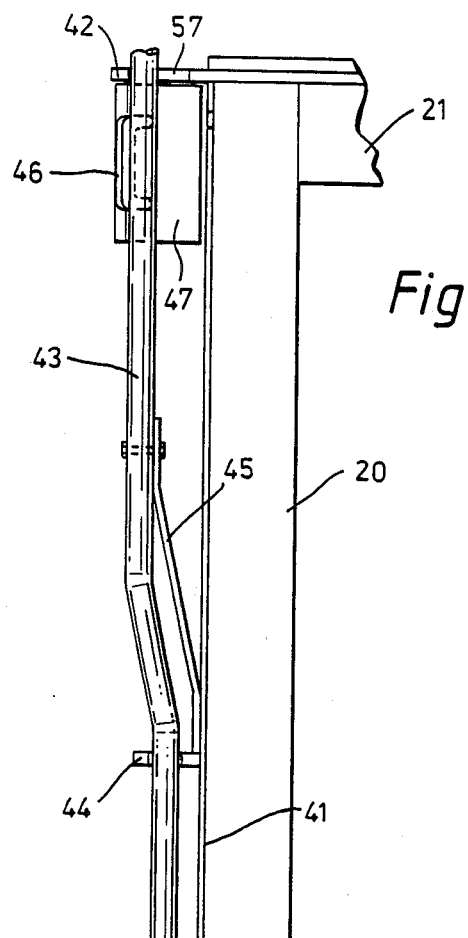
FIG. 13 illustrates a strap for the shutting stile and on which latching parts including a latching bar are mounted.
Figure 16:
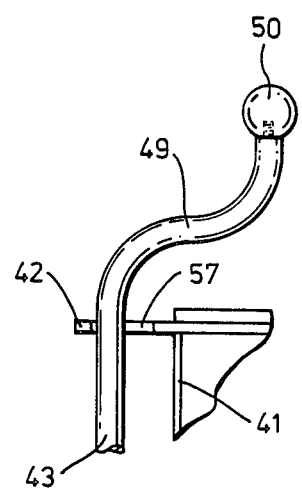
FIG. 16 illustrates a cranked, upper portion and handle of the latching bar.
Figure 14:
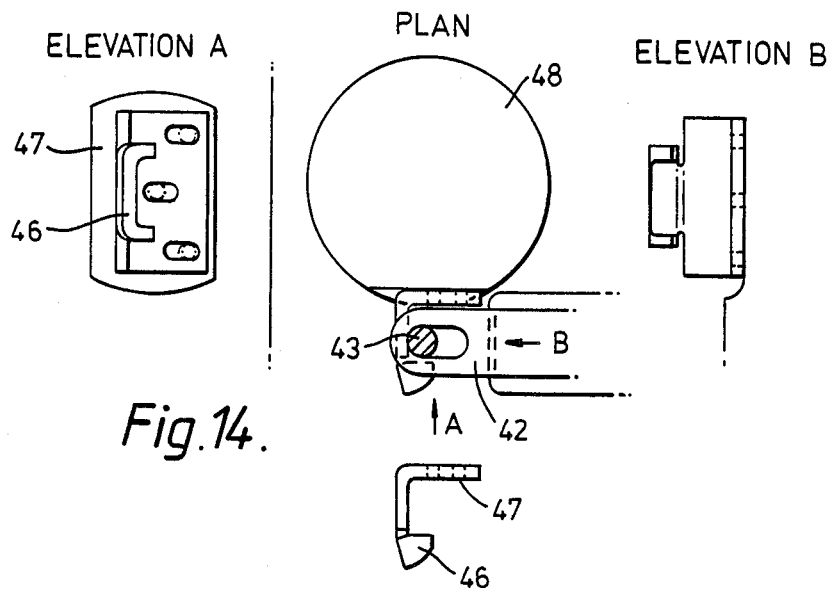
FIGS. 14 and 15 show retainers mounted on a latching gatepost for cooperating with the latching bar.
Figure 15:
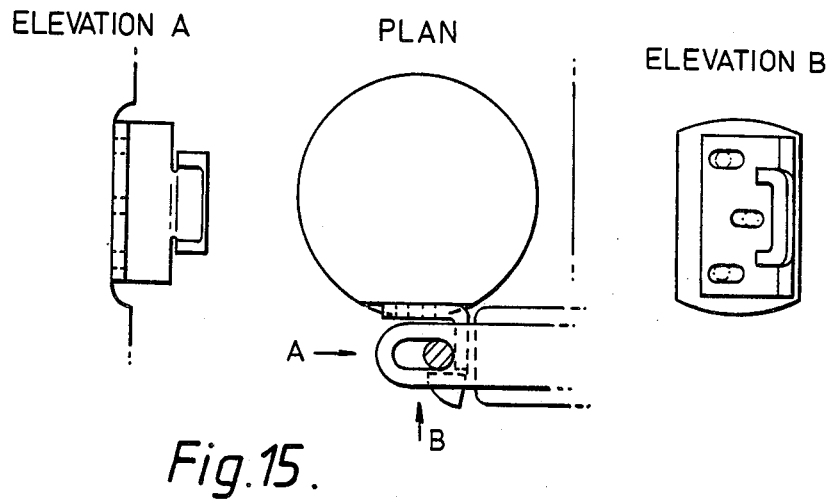
Figure 20:
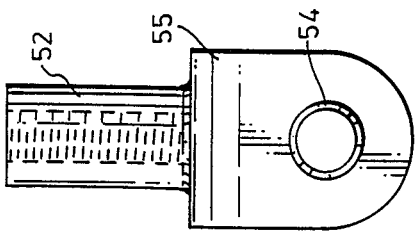
FIGS. 17 to 20 illustrate a hanging pin bracket for mounting on a hanging gatepost to form part of an upper gate hinge; and, FIGS. 21 to 23 illustrate a post bracket for mounting on the hanging gatepost to form part of a lower gate hinge.
Figure 19:
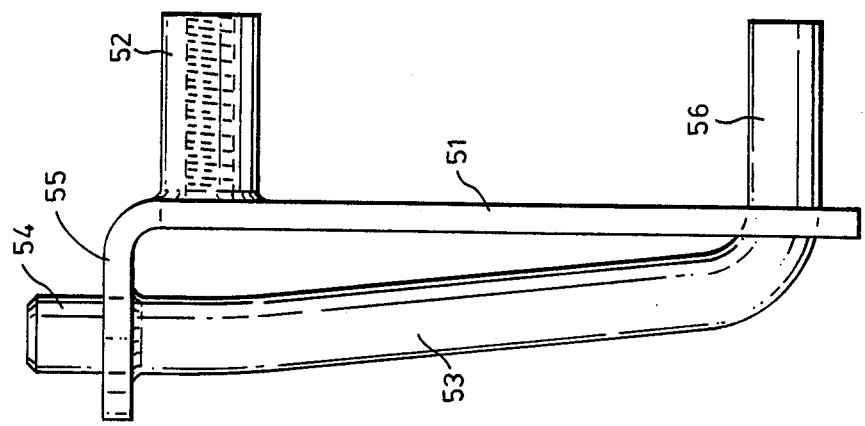
Figure 18:
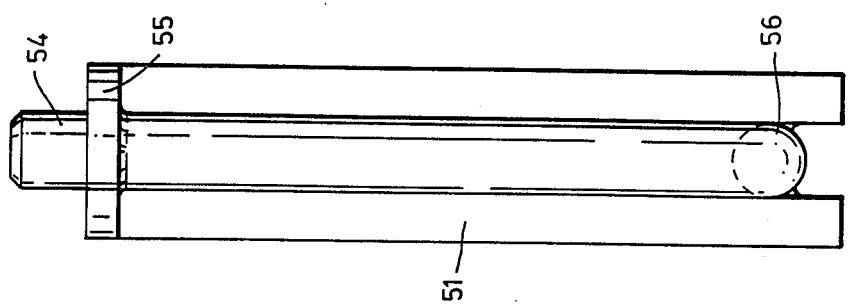
Figure 17:
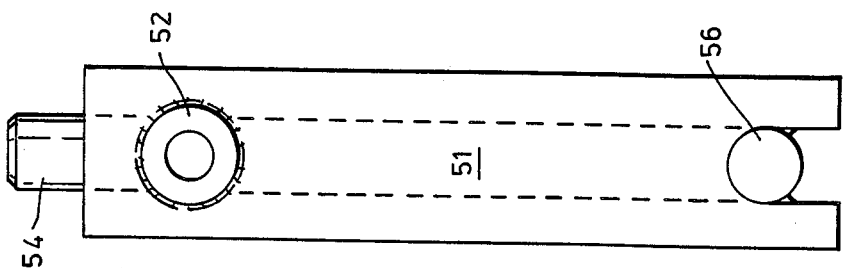

A complementary strap 41 for fitting in the recess 27 of the shutting stile 20, is shown in FIG. 13. This strap has flanges 42 projecting at its upper and lower ends and formed with slots 57 for guiding the upper and lower ends of a tubular latching bar 43 in accordance with the third aspect of the invention. The strap also has an apertured flange 44 providing a rocking pivot for the bar 43. A leaf spring 45 is secured to and extends between the strap 41 and bar 43 to urge the bar to swing in the anticlockwise direction. When the gate is slammed shut, the upper and lower ends of the bar 43 ride over and catch behind retainers 46, which are formed integrally with metal plates 47 secured to a gatepost, in this case a round timber post 48. The retainers at the top and bottom of the gatepost are formed similarly to one another but mounted with the opposite hand as shown in FIGS. 14 and 15. In order to open the gate the bar 43 has at its upper end a cranked portion 49 terminating in a handle 50, as shown in FIG. 16. The gate may be locked shut by passing the yoke of a padlock through the upper slot 57, thereby preventing the opening movement of the bar 43.

A hanging pin bracket for cooperation with the flange 39, and in accordance with the fourth aspect of the invention, is illustrated in FIGS. 17 to 20. An L-shaped metal plate strip 51 has welded to it an internally screw threaded spigot 52 and an L-shaped bar 53, an upper portion of which provides a hinge pin 54 above a flange 55 provided by the strip 51, and a second lower horizontal projection 56 for reception, with the spigot 52, in the hanging gatepost.

Figure 21:
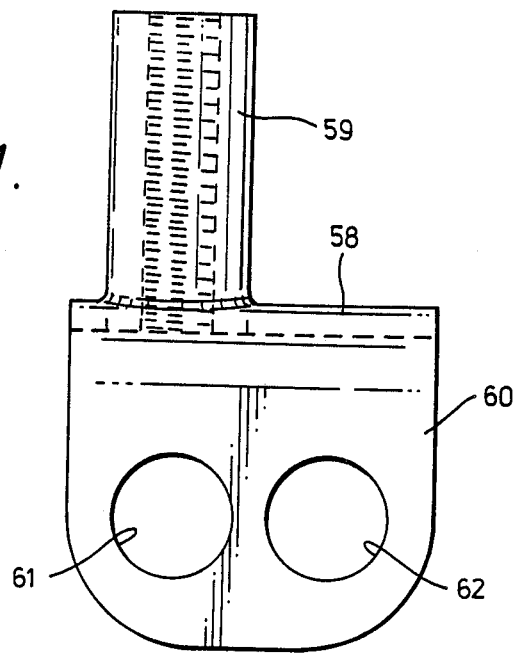
Figure 22:
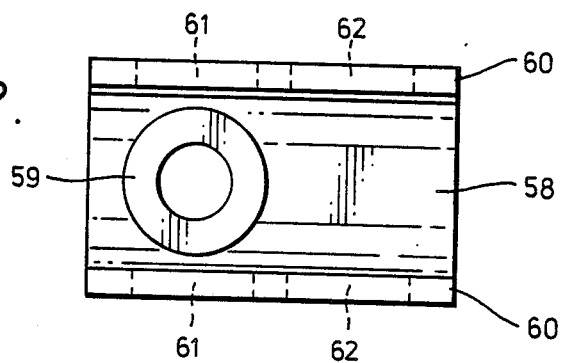
Figure 23:
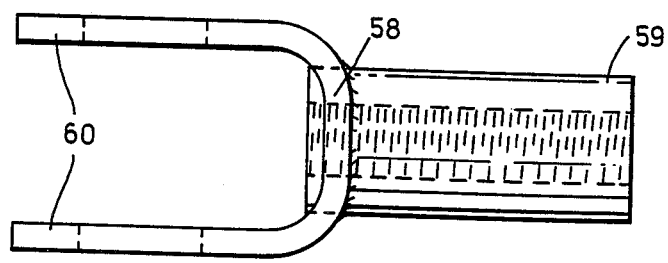

A lower post bracket, in accordance with the fifth aspect of the invention, is shown in FIGS. 21 to 23. This has a body 58 with an internally screw threaded spigot 59 welded to it, and two integral, horizontally projecting plate portions 60 to receive between them the horizontal portion of a complementary gate bracket. The plate portions 60 have two pairs of aligned holes 61 and 62, for a hinge pin. The hole 61 allows for straight swinging and the hole 62 for raised swinging to one side or the other depending upon which plate portion is used uppermost.

We claim:

1. A gate comprising a rectangular frame of upper and lower timber rails, a hanging timber stile and a shutting timber stile; said frame having at each corner a rigid connection between a rail end and a stile end, said connection being formed by a side face of one of said ends overlapping the end face of the other of said ends with a bolt extending transversely through said one and longitudinally into said other of said ends where it screws through a screw threaded aperture in an insert which has been inserted into a transverse slot in said other of said ends, and angular metal straps wrapped around each corner of said frame, each bolt passing through an aperture in one arm of a respective strap before entering transversely said one stile or rail end.

2. A gate according to claim 1, wherein said stile ends overlap the end surfaces of said top and bottom rail ends so that said bolts extend horizontally through said stile ends and are screwed into said inserts let into said rails.

3. A gate according to claim 1, wherein the other arm of said strap passes over the end surface of that stile or rail end and overlaps the side surface of said other stile or rail end, to which it is secured.

4. A gate according to claim 1, wherein said straps at the top and bottom of each stile are integrally connected by an intermediate strap portion to provide a full height stile strap.

5. A gate according to claim 1, further comprising a panel of infilling received within a rebate extending around an inner edge of each of said upper and lower rails and/or stiles.

6. A gate according to claim 1, further comprising a latching device having an elongate member which is carried by said frame and extends upwards alongside said shutting stile of said frame, said member being mounted so that it may rock about an axis substantially about its mid point and perpendicular to the plane of said frame with a limited freedom of movement, and being urged by a spring to rock in one sense; and a pair of retainers which are carried one adjacent to the top and one adjacent to the bottom of a shutting post for said gate, for engaging said elongate member adjacent to its upper and lower ends respectively when said gate is shut to hold said gate shut.

7. A gate according to claim 6, wherein said elongate member is a metal rod or tube, which is guided in slots carried by said frame at its shutting end adjacent to its upper and lower ends, and which passes through a yoke adjacent to its mid point, to provide said rocking pivot.

8. A gate according to claim 7, wherein said spring for urging said member to rock in one direction is a leaf spring which extends generally in the vertical direction between a fixing to said frame and a fixing to said elongate member, with said spring substantially supporting the weight of said elongate member.

9. A gate comprising a rectangular frame of upper and lower timber rails, a hanging timber stile and a shutting timber stile; said frame having at each corner a rigid connection between a rail end and a stile end, said connection being formed by a side face of one of said ends overlapping the end face of the other of said ends with a bolt extending transversely through said one and longitudinally into said other of said ends where it screws through a screw threaded aperture in an insert which has been inserted into a transverse slot in said other of said ends, one or more inclined reinforcing struts extending between said top and bottom rails, wherein the underside of said top rail, and/or the upper side of said bottom rail, is flat and horizontal and each strut end surface is chamfered so as to be horizontal and is located adjacent to the respective horizontal rail surface with an interposed plate connector, and the joint is secured by a bolt passing transversely through said rail, through a hole in said plate connector, and into a screw threaded aperture in a barrel nut which has been inserted transversely into said strut.

10. A gate comprising a rectangular frame of upper and lower timber rails, a hanging timber stile and a shutting timber stile; said frame having at each corner a rigid connection between a rail end and a stile end, said connection being formed by a side face of one of said ends overlapping the end face of the other of said ends with a bolt extending transversely through said one and longitudinally into said other of said ends where it screws through a screw threaded aperture in an insert which has been inserted into a transverse slot in said other of said ends, a hanging pin bracket having a body which is arranged to abut the side of a hanging gatepost, and which has two horizontally projecting portions which are arranged to be received in vertically spaced holes in said hanging gatepost, an upper said projecting portion being an internally screw threaded spigot which is arranged to receive a bolt inserted through, and from the far side of, said hanging gatepost; and said body carrying an upstanding hinge pin to be received in an aperture in a gate bracket, and a flange spaced from the upper end of said hinge pin for said gate bracket to rest upon.

11. A gate according to claim 10, wherein said bracket body comprises an inverted L-shaped strip of plate, the horizontal arm of which provides said flange and the vertical arm of which is arranged to abut said hanging gatepost; and a substantially L-shaped metal bar, a vertical arm of which passes upwards through said horizontal arm of said plate strip to provide said hinge pin, and a horizontal arm of which passes through the lower part of said vertical arm of said plate strip to provide said lower horizontal projecting portion.

12. A gate comprising a rectangular frame of upper and lower timber rails, a hanging timber stile and a shutting timber stile; said frame having at each corner a rigid connection between a rail end and a stile end, said connection being formed by a side face of one of said ends overlapping the end face of the other of said ends with a bolt extending transversely through said one and longitudinally into said other of said ends where it screws through a screw threaded aperture in an insert which has been inserted into a transverse slot in said other of said ends, a lower bracket for a hanging gatepost, said lower bracket having a body which is arranged to abut the side of said hanging gatepost, and has a horizontally projecting internally screw threaded spigot which is arranged to be received in a hole in said hanging gatepost and to receive a bolt inserted through, and from the far side of, said hanging gatepost to secure said lower bracket to said post; and a horizontal portion projecting in use from said body and provided with a plurality of holes spaced from one another perpendicular to the plane of said gate, selectively to receive a hinge pin interconnecting said lower bracket with a gate hinge bracket.

* * * * *